United States Patent
Schindler et al.

(10) Patent No.: US 8,215,201 B2
(45) Date of Patent: Jul. 10, 2012

(54) ADJUSTABLE STEERING ASSEMBLY

(75) Inventors: Kevin Schindler, Red Lake Falls, MN (US); Andrew Beavis, Goodridge, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 1017 days.

(21) Appl. No.: 11/740,228

(22) Filed: Apr. 25, 2007

(65) Prior Publication Data

US 2008/0264196 A1    Oct. 30, 2008

(51) Int. Cl.
*B62D 1/18* (2006.01)
*F16B 7/10* (2006.01)
(52) U.S. Cl. ............... 74/493; 403/109.5; 403/109.7
(58) Field of Classification Search ............... 74/493; 280/279; 403/109.1, 109.2, 109.3, 109.5, 403/109.7
See application file for complete search history.

(56) References Cited

U.S. PATENT DOCUMENTS

| | | | | |
|---|---|---|---|---|
| 2,744,419 | A | * | 5/1956 | Chayne ............... 74/493 |
| 3,302,478 | A | * | 2/1967 | Pauwels ............... 74/493 |
| 3,316,774 | A | * | 5/1967 | Vogelgesang ............... 74/493 |
| 4,384,861 | A | | 5/1983 | Lange et al. |
| 4,390,300 | A | * | 6/1983 | Foster ............... 403/24 |
| 4,495,834 | A | * | 1/1985 | Bauer et al. ............... 74/493 |
| 5,267,480 | A | | 12/1993 | Krizan |
| 5,890,397 | A | | 4/1999 | Stoner et al. |
| 7,344,329 | B2 | * | 3/2008 | Hutchinson et al. ....... 403/109.1 |

FOREIGN PATENT DOCUMENTS

EP    0841236    11/1997

OTHER PUBLICATIONS

Investment Caster Steers Parts Manufacturer in Right Direction, http://www.castsolutions.com/archive/castingsucesses; 2 pages, Printed Oct. 2006.

* cited by examiner

*Primary Examiner* — Thomas R Hannon
*Assistant Examiner* — Alan Waits
(74) *Attorney, Agent, or Firm* — Lowe Graham Jones PLLC (57) ABSTRACT

A vehicle, such as an all-terrain or utility-terrain vehicle, includes a telescoping, adjustable, steering assembly. The steering assembly includes a steering device that is coupled to the steering assembly, which can be adjusted to increase or decrease the height of the steering device. The steering assembly may include a detent member, a steering post, a yoke, a collar, and a biasing member. The steering post includes axially spaced arcuate grooves where a detent member is seated and held in place with a collar. The collar includes a tapered internal surface for applying lateral pressure to the detent member to lock the yoke in place relative to the steering post. Without the use of tools, the collar may be moved to release the lateral pressure on the detent member, which in turn permits the yoke to be moved relative to the steering post—resulting in adjustment of the steering device.

8 Claims, 7 Drawing Sheets

ADJUSTABLE STEERING ASSEMBLY

FIELD OF THE INVENTION

This invention relates generally to an adjustable steering assembly and, more specifically, to a telescoping steering assembly for a variety of vehicles.

BACKGROUND OF THE INVENTION

Conventional steering assemblies that have a telescoping feature are available in a variety of vehicles or vessels. However, these conventional steering assemblies require the operator to utilize tools and/or loosen bolts to adjust a height of a steering device (e.g., handlebars) coupled to the steering assembly. In addition, the conventional steering assemblies may have steering posts with holes to receive the bolts. One drawback of placing holes in the steering post, however, is that the holes may act as stress concentration points and weaken the steering post or provide a site for crack initiation. Some conventional steering assemblies are described in U.S. Pat. No. 5,267,480 to Krizan (the '480 patent) and for the purpose of brevity will not be described in further detail. The '480 patent is incorporated herein by reference.

It would be desirable to have a steering assembly that can be used in a variety of vehicles. The steering assembly should overcome at least some of the aforementioned drawbacks and preferably be low maintenance and readily adjustable in a variety of environments.

SUMMARY OF THE INVENTION

The present invention relates to an adjustable steering assembly and, more specifically, to a quick-adjust telescoping steering assembly for a variety of vehicles or vessels, such as, but not limited to snowmobiles, all-terrain vehicles (ATVs), and utility-terrain vehicles (UTVs).

In accordance with an aspect of the invention, a steering assembly for a vehicle includes a detent member, a steering post, a yoke, and a movable device. The steering post extends along a longitudinal axis and includes a plurality of recesses and a torque-transferring portion. The recesses are spaced axially relative to the longitudinal axis and are sized to receive at least a portion of the detent member. The yoke includes an upper portion and a lower portion, where the lower portion includes a wall with an inner perimeter configured to closely receive the torque-transferring portion of the steering post. The wall includes a through opening sized to receive another portion of the detent member. The movable device may be a collar, for example, to releasably urge the detent member into at least one of the recesses of the steering post and then to selectively secure the yoke relative to the steering post.

In accordance with another aspect of the invention, a vehicle includes a steering device coupled to a steering assembly. The steering assembly includes a detent member, a steering post, a yoke, and a movable device arranged for quickly adjusting a height of the steering device without the use of adjustment tools. The steering assembly according to this aspect of the invention is substantially similar to the above-described steering assembly and thus the summary details will not be provided herein for the purpose of brevity.

In accordance with yet another aspect of the invention, a method for adjusting a steering device of a vehicle includes releasing a detent member from a first recess of a steering post. And then, moving, by hand, a yoke relative to the steering post to adjust a height of the steering device, the detent member operatively coupled to the yoke. Lastly, the method includes seating or re-seating the detent member in a second recess of the steering post to secure the yoke relative to the steering post at the desired height.

In accordance with still yet another aspect of the invention, an adjustable steering assembly for a vehicle includes a means for selectively adjusting a yoke relative to a steering post, the means for selectively adjusting formed in the steering post and a means for releasably securing a detent member in one of the means for selectively adjusting.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention is a telescoping, quick-adjusting, steering assembly usable on a variety of vehicles, such as, but not limited to snowmobiles, ATVs, UTVs, vessels and other watercraft, utility vehicles, construction vehicles, etc. The structural arrangement of the components of the steering assembly allows a height of a steering device, for example a pair of handlebars or a steering wheel, to be adjusted by hand. As a result, the adjustment process may be initiated, carried out, and completed without employing any adjustment tools and also without having to loosen bolts or fasteners.

Figure 1:
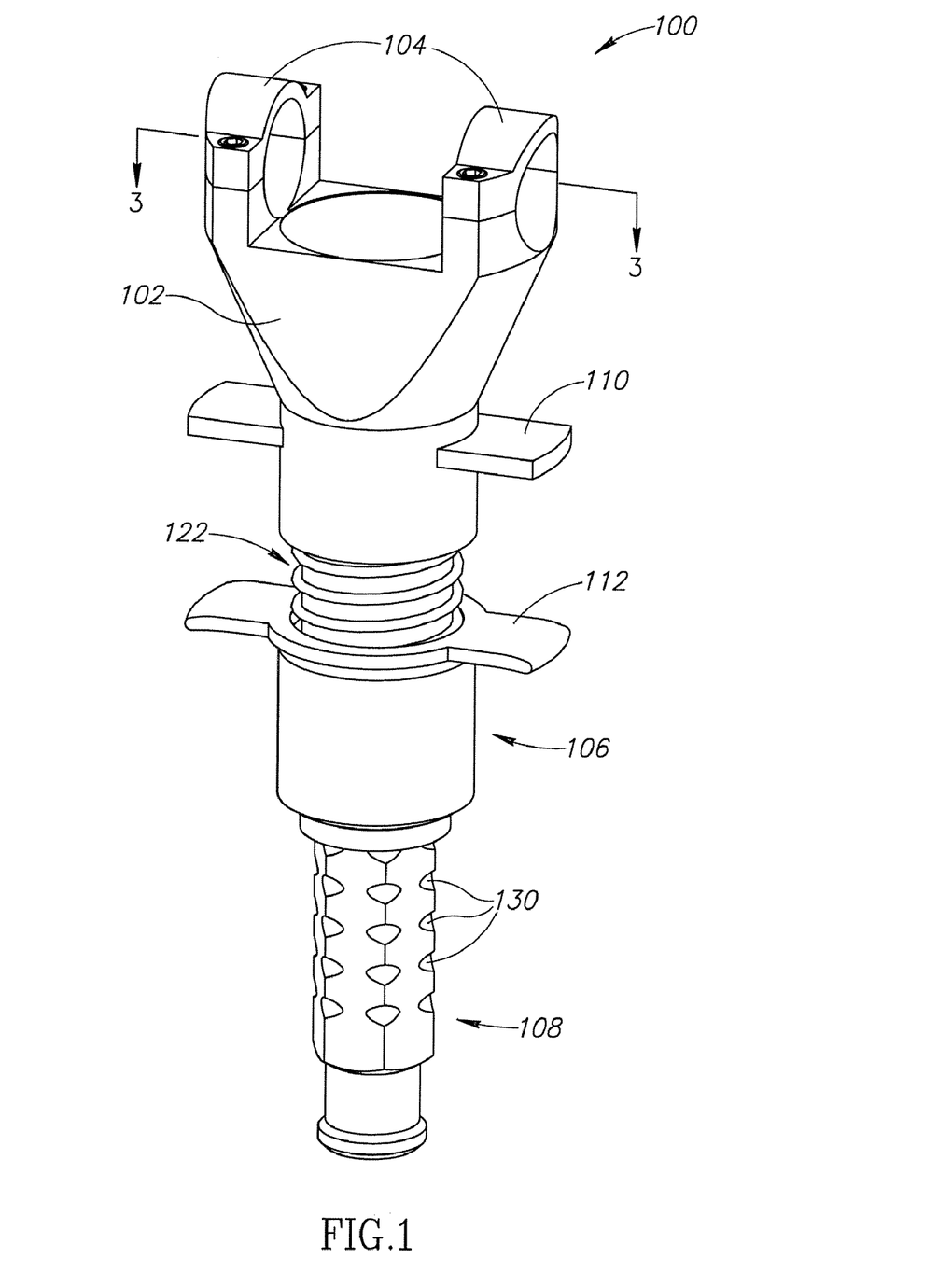
FIG. 1 is a isometric view of a steering assembly according to an embodiment of the present invention.
Figure 2:
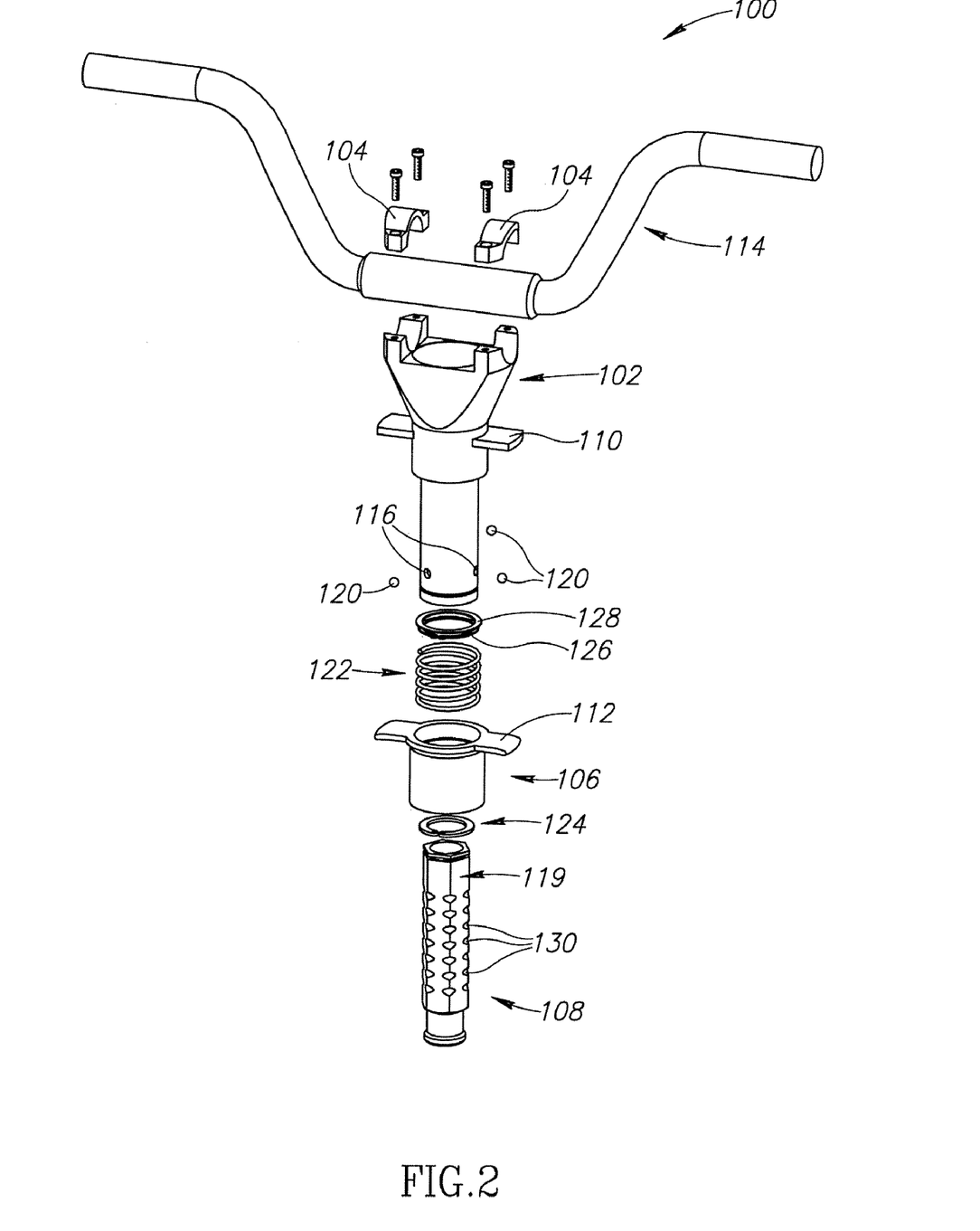
FIG. 2 is an exploded, isometric view of the steering assembly of FIG. 1.
Figure 3:
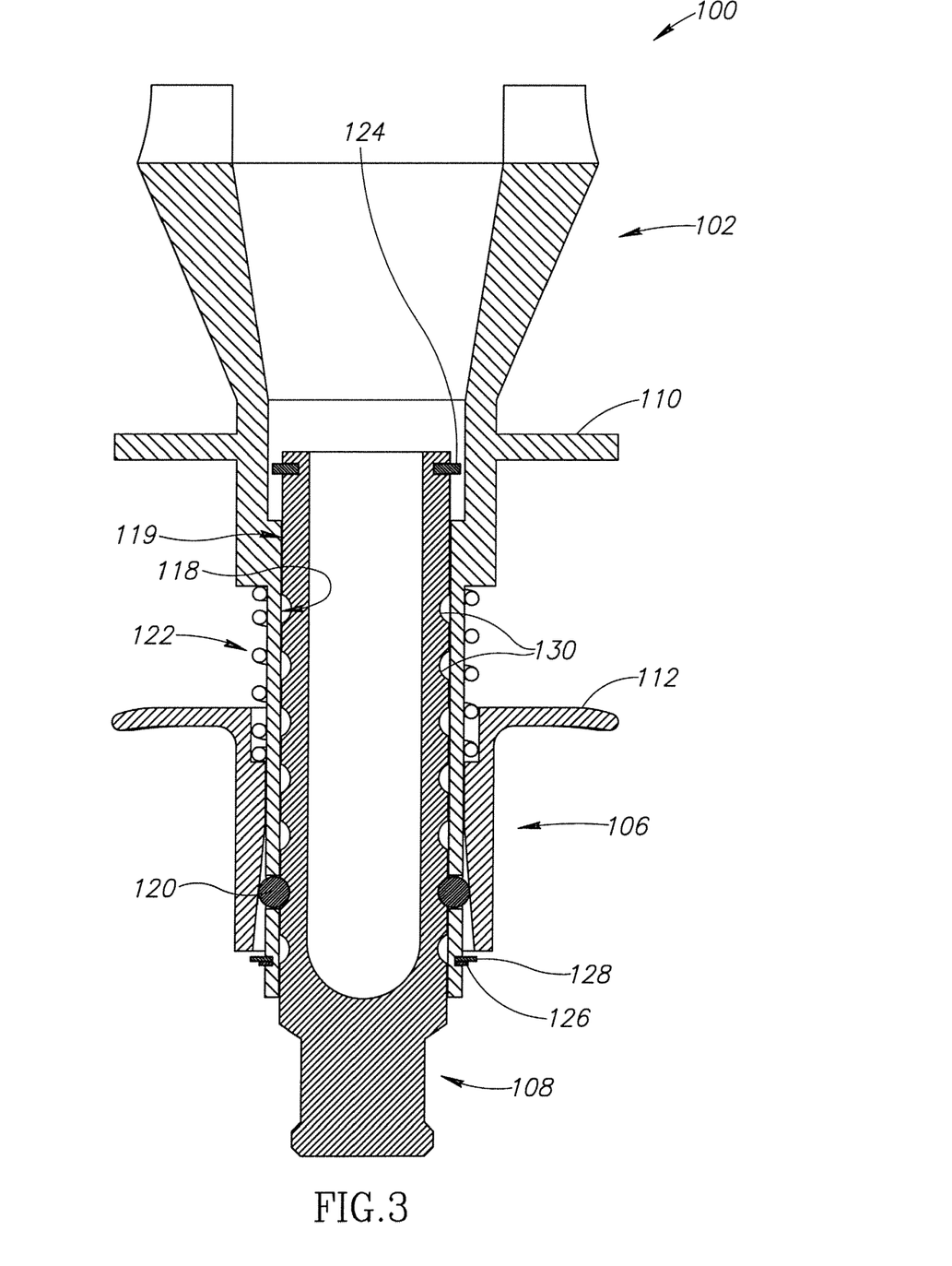
FIG. 3 is a cross-sectional view of the steering assembly of FIG. 1 having a yoke, a locking collar, and a steering post.

FIGS. 1-3 show a steering assembly 100 having a steering yoke 102 with yoke caps 104. The steering assembly 100 further includes a collar 106 and a steering post 108. The yoke 102 includes an outwardly extending yoke flange 110 while the collar 106 includes an outwardly extending collar flange 112. The flanges 110, 112 are spaced and sized to be grippable by an operator's thumb and fingers (not shown). In one embodiment and as best shown in FIG. 2, the yoke caps 104 are fastened to the yoke 102 to secure a steering device 114, such as handlebars.

In one embodiment, the yoke 102 includes openings 116 and a shaped inner surface 118 (FIG. 3). The openings 116 receive and vertically support detents members 120, which may take the form of metallic ball bearings, cylinders, rounded pins, or some other equivalent structure capable of providing a positive lock between the collar 106 and the yoke 102. The shaped inner surface 118 of the yoke 102, in one embodiment, is a polygonally shaped inner surface that corresponds with a polygonally shaped outer surface 119 of the steering post 108. The respective shapes permit a transfer of torque from the yoke 102 to the steering post 108. In the illustrated embodiment, the torque-transferring shapes, as described above, may be hexagonal shapes, or another equivalent shape capable of transferring torque—for example square, rectangular, elliptical, etc. It is appreciated that at least one purpose of the respective surfaces 118, 119 is to transfer steering torque from the steering device 114 to wheels, tracks, rudder, or some other steer-able member of the vehicle. Alternatively then, a torque connection between the yoke 102 and the steering post 108 may be any mechanical connection capable of transferring torque. For example, the torque connection between the yoke 102 and steering post 108 may be keys engaged in channels, internal splines engaged with external splines, or some other equivalent means for transferring torque.

A biasing member 122 is located between the yoke 102 and the collar 106. An upper snap ring 124 engaged with the steering post 108 prevents the yoke 102 from sliding off the steering post 108 while a lower snap ring 126 and washer 128 engaged with the yoke 102 prevents the collar 106 from sliding off a lower end of the yoke 102.

The steering post 108 includes arcuate grooves 130 that are axially spaced along a length portion of the steering post 108. The grooves 130 provide a seat for the detent member 120 and therefore the placement of the detent member 120 in a selected groove 130 will determine a height of the steering device 114. Stated differently, the placement of the detent member 120 in a selected groove 130 will determine a relative position of the yoke 102 with respect to the steering post 108. Now, additional details regarding the yoke 102, the collar 106, and the steering post 108 are provided below.

Figure 4:
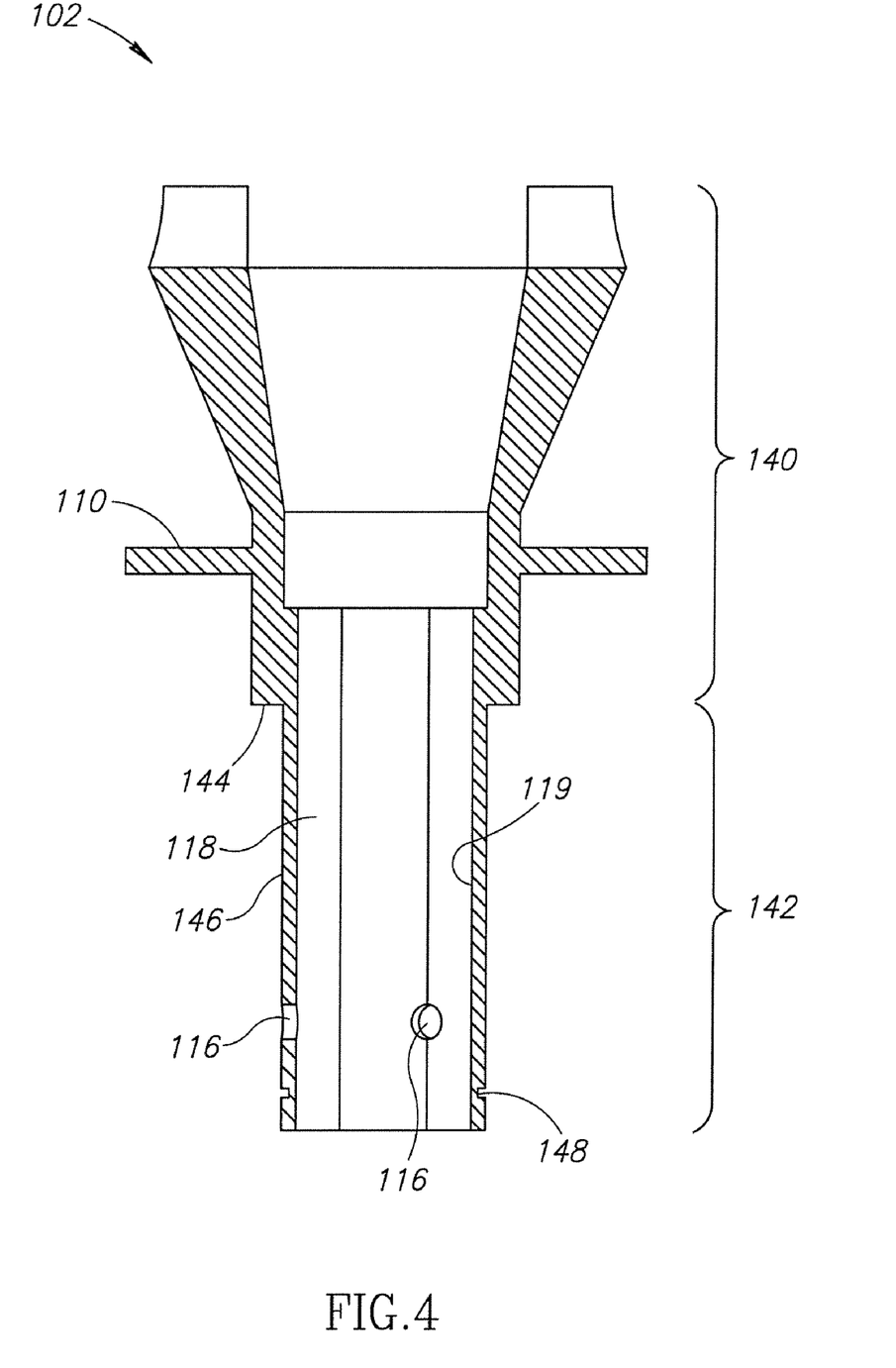
FIG. 4 is a cross-sectional view of the yoke of FIG. 3.

FIG. 4 shows the yoke 102 having an upper portion 140 and a lower portion 142 separated by a shoulder 144. The lower portion 142 includes a wall 146 having the shaped inner surface 118. In addition, the yoke 102 includes a groove, notch, or equivalent recess 148 to receive the snap ring 126 and the washer 128. The washer 128 may be a split washer that is expandable and then contractable to fit over the larger diameter portion of the yoke 102. The notch 148 is sized so that the snap ring 126 and the washer 128 are closely received in the notch 148. The washer 128, in turn, extends radially outward by an amount sufficient to block downward motion of the collar 106 in the event the collar 106 was moved too far down the lower portion 142 of the yoke 102.

Figure 5:
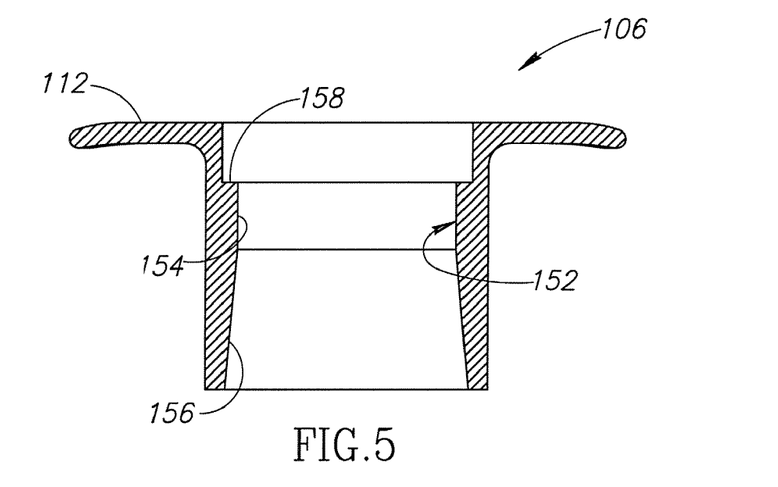
FIG. 5 is a cross-sectional view of the locking collar of FIG. 3.

FIG. 5 shows the collar 106 having an inner surface 152 according to one illustrated embodiment. The inner surface 152 includes a straight portion 154 that transitions into a tapered or sloped portion 156. In addition, the collar 106 includes a shoulder 158 that cooperates with the shoulder 144 of the yoke 102 to retain the biasing member 122 (FIG. 3) between the yoke 102 and the collar 106. As previously mentioned, the biasing member 122, according to one embodiment, is a compression spring that continually urges the tapered portion 156 of the internal surface 152 of the collar 106 downward onto the detent member 120 unless or until the operator pulls up on the flanges 112 of the collar 106—which is done during adjustment of the steering assembly 100 and explained in greater detail below.

Figure 6:
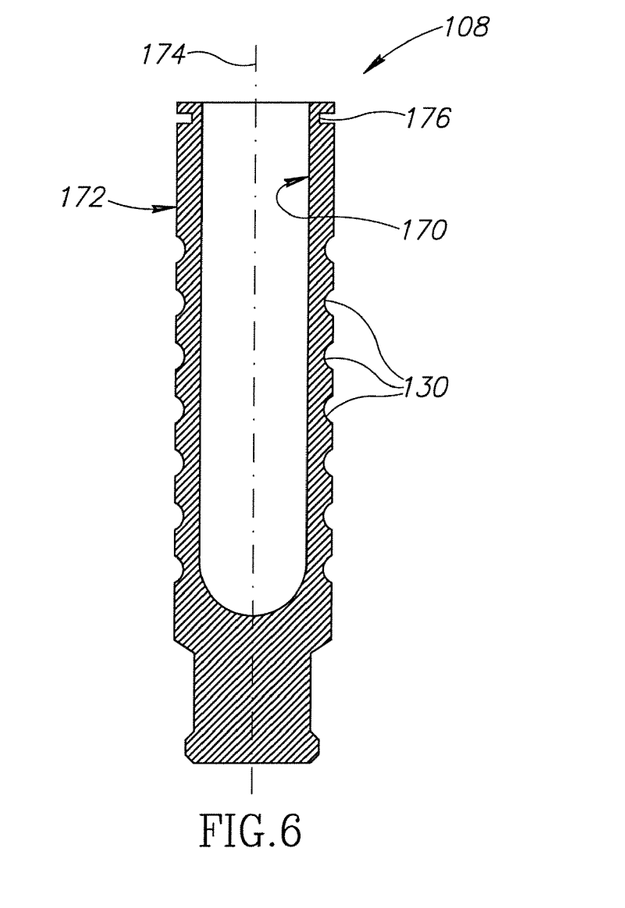
FIG. 6 is a cross-sectional view of the steering post of FIG. 3.

FIG. 6 shows the steering post 108 having an inner surface 170 and an outer surface 172. The steering post 108 is an elongated shaft that extends lengthwise longitudinally along a longitudinal axis 174. A groove, notch, or equivalent recess 176 is formed in an upper portion of the steering post 108 and is sized to receive the snap ring 124 (FIG. 3).

As previously discussed, the outer surface 172 of the steering post 108 may have a polygonal shape for the purpose of transferring torque. In a first embodiment and as best shown in FIG. 1, the grooves 130 are formed in the corners of the polygonal shape, but do not extend continuously around the steering post 108. Further, the axially spaced arcuate grooves 130 can be formed substantially perpendicular to the longitudinal axis 174 of the steering post 108. Alternatively, the grooves 130 may be formed continuously around the steering post 108 as circumferentially grooved channels, for example, that are axially spaced along the steering post 108.

Figure 7:
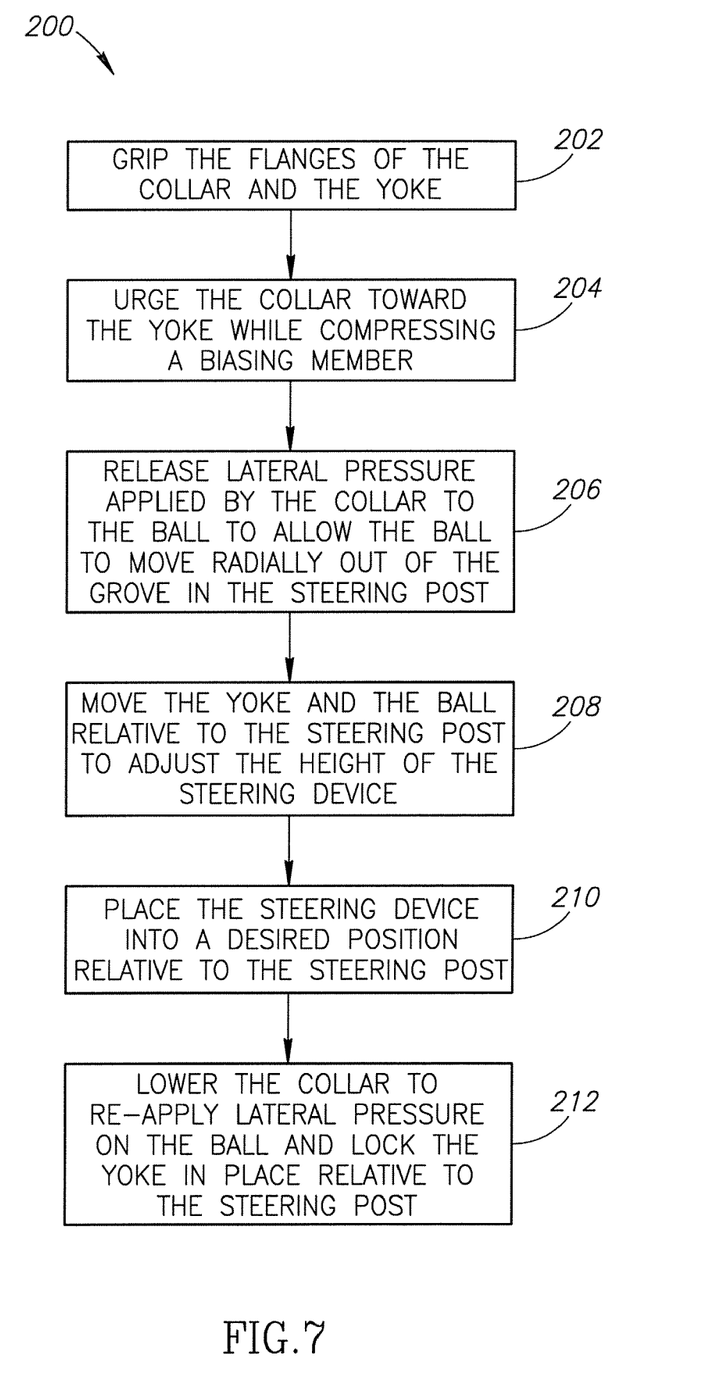
FIG. 7 is a flowchart showing a method for adjusting a steering assembly of a vehicle.
Figure 8:
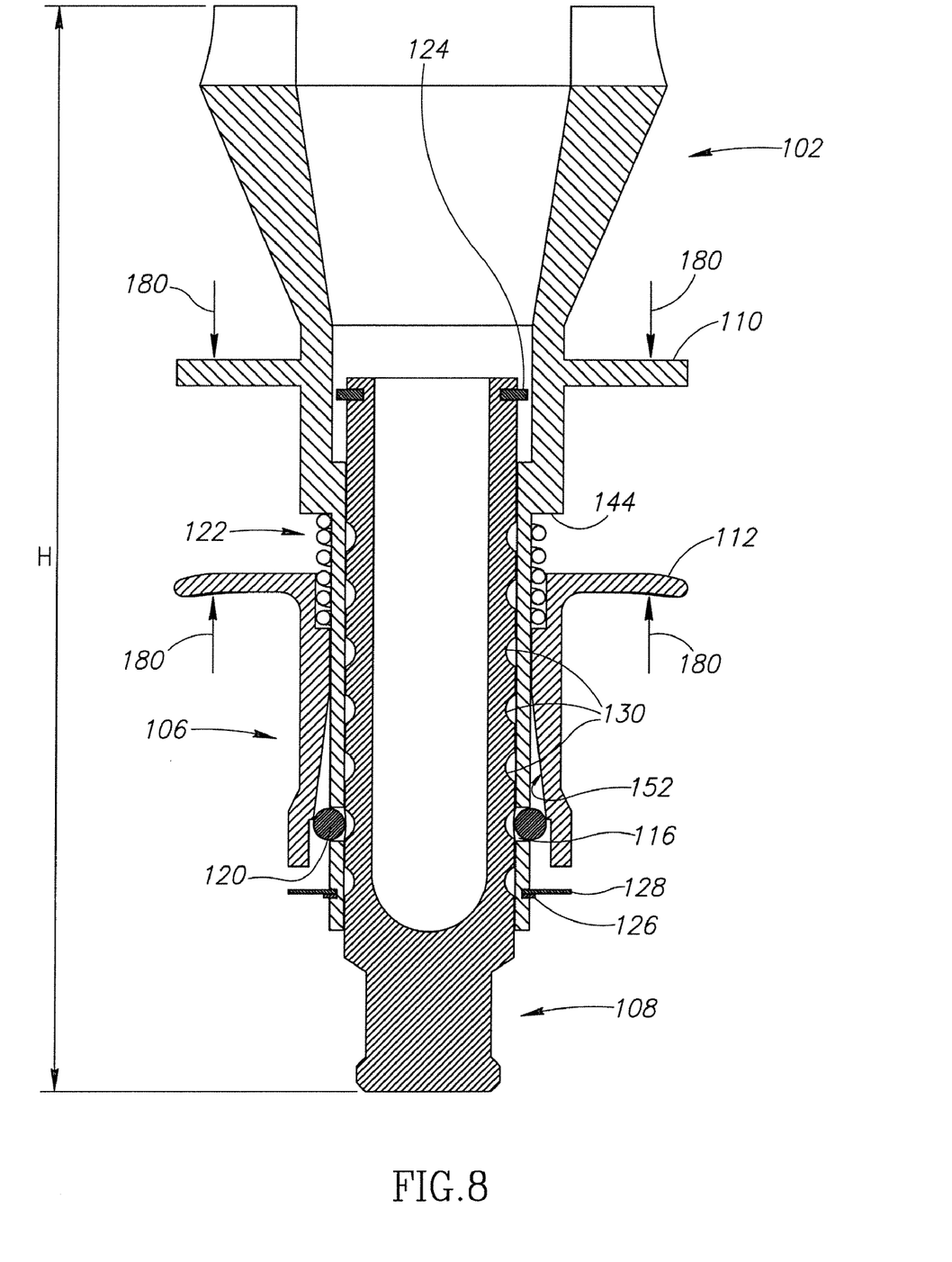
FIG. 8 is a cross-sectional view of a steering assembly according to another embodiment of the present invention.

FIG. 7, in conjunction with and reference to FIG. 8, shows a method 200 for adjusting a height of a steering device coupled to a steering assembly, such as the steering assembly 100 described above. For the purpose of describing the adjustment process, the steering assembly 100 will be used for reference. At step 202, the collar flange 112 of the collar 106 and the yoke flange 110 of the yoke 102 are gripped by an operator's hands (e.g., thumb and fingers), which are represented by arrows 180 (FIG. 8). At step 204, the operator urges the collar flange 112 toward the yoke flange 110 to raise the collar 106 relative to the yoke 102. The operator may use one or two hands to grip the flanges 110, 112. The biasing member 122 is designed to be compressible by application of the operator's hand strength, yet strong enough to continually urge the collar 106 onto the detent member 120 and thus lock the steering assembly 100. By raising the collar 106 and at step 206, an amount of lateral pressure present between the inner surface 152 of the collar 106 and the detent member 120 is released to allow the ball 102 to move radially outward away from its seated position in one of the arcuate grooves 130 of the steering post 108.

At step 208 and after the lateral pressure applied by the collar 106 on the detent member 120 has been released, the operator moves the yoke 102 and the detent member 120, which is held in the opening 116, relative to the steering post 108 to adjust the height of the steering device (not shown). For purposes of this description, the height of the steering device is the overall height, H, between the top of the yoke 102 and the bottom of the steering post 108 as shown in FIG. 8. The steering device is fixed to the yoke 102 with the yoke clamps 104 (FIG. 2). At step 210, the operator places the steering device into a desired position—hence the detent member 120 is moved to a different groove 130 in the steering post 108. At step 212 and after the operator has the steering device adjusted to the satisfactory position, the operator lowers the collar 106 relative to the yoke 102, which causes the inner surface 152 of the collar 106 to re-apply lateral pressure on the detent member 120 and thus lock or secure the yoke 102 and the detent member 120 relative to the steering post 108. Advantageously, the method 200 may be accomplished, from start to finish, without employing any adjustment tools and without loosening any fasteners.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A steering assembly for a vehicle, the steering assembly comprising:
    a yoke having a yoke body comprising an upper yoke portion adjacent a lower yoke portion with an integral yoke shoulder formed therebetween, the upper yoke portion having a yoke arm extending therefrom, the lower yoke portion having an opening configured to receive a detent member;

handlebars directly coupled to the yoke and the handlebars are rotationally fixed and vertically adjustable with the yoke;

a compressible biasing member having a first end and a second end, the first end in contact with the yoke shoulder;

a collar having a collar arm extending from a cylindrical collar body, the collar arm arranged to be manually grasped in conjunction with the yoke arm such that the collar may be moved relative to the yoke; and a steering post sized to be received by at least the lower yoke portion, the steering post having a non-circular outer surface configured to complementarily cooperate with a non-circular inner surface of at least the lower yoke portion to transfer torque through contact between the surfaces, the outer surface having a set of discrete circumferentially spaced recessed portions generally at a same axial position on the outer surface, and at least one other recessed portion axially spaced from the set along the steering post, the individual recessed portions being sized to selectively engage with the detent member of the yoke, wherein the collar frictionally urges the detent member into one of the recessed portions until the collar arm is manually moved toward the yoke arm to compress the biasing member, and wherein the lower yoke portion, the collar and the biasing member are substantially concentrically aligned about an axis defined by the steering post.

2. The steering assembly of claim 1, wherein the yoke arm includes a grippable portion.

3. The steering assembly of claim 1, wherein the collar includes a tapered internal surface for slidably engaging the detent member and for substantially maintaining the detent member in one of the recessed portions of the steering post.

4. The steering assembly of claim 1, wherein the collar arm includes a grippable portion.

5. The steering assembly of claim 1, wherein the biasing member is a compression spring.

6. The steering assembly of claim 1, wherein the recessed portions of the steering post are arcuate grooves.

7. The steering assembly of claim 1, wherein the detent member is a ball bearing.

8. The steering assembly of claim 1, wherein the torque-transferring surface of the steering post is a hexagonally-shaped surface.

\* \* \* \* \*